US009467867B1

(12) United States Patent
Hasegawa et al.

(10) Patent No.: US 9,467,867 B1
(45) Date of Patent: Oct. 11, 2016

(54) WIRELESS COMMUNICATION SYSTEM (71) Applicant: Hitachi Kokusai Electric Inc., Chiyoda-ku, Tokyo (JP)

(72) Inventors: Keigo Hasegawa, Tokyo (JP); Masayuki Takekawa, Tokyo (JP)

(73) Assignee: HITACHI KOKUSAI ELECTRIC, INC., Tokyo (JP)

( * ) Notice: Subject to any disclaimer, the term of this patent is extended or adjusted under 35 U.S.C. 154(b) by 0 days.

(21) Appl. No.: 15/035,655

(22) PCT Filed: Nov. 13, 2014

(86) PCT No.: PCT/JP2014/080009
§ 371 (c)(1),
(2) Date: May 10, 2016

(87) PCT Pub. No.: WO2015/072497
PCT Pub. Date: May 21, 2015

(30) Foreign Application Priority Data

Nov. 13, 2013 (JP) .................. 2013-234716

(51) Int. Cl.
*H04W 16/14* (2009.01)
*H04W 92/20* (2009.01)
*H04W 72/04* (2009.01)

(52) U.S. Cl.
CPC ......... *H04W 16/14* (2013.01); *H04W 72/0406* (2013.01); *H04W 92/20* (2013.01)

(58) Field of Classification Search
CPC ........... H04W 16/14; H04W 72/0406; H04W 92/20; H04W 40/24; H04W 84/12; H04W 88/02; H04W 88/08
See application file for complete search history.

(56) References Cited

U.S. PATENT DOCUMENTS

2012/0282959 A1 11/2012 Abraham et al.
2013/0182660 A1 7/2013 Takekawa et al.

FOREIGN PATENT DOCUMENTS

JP 2011-223153 A 11/2011
JP 2013-529448 A 7/2013
WO 2012/061504 A2 5/2012

OTHER PUBLICATIONS

"IEEE P802.22b™/D1.0 Draft Standard for Wireless Regional Area Networks Part 22: Cognitive Wireless RAN Medium access Control (MAC) and Physical Layer (PHY) specifications: Policies and procedures for operation in the TV Bands—Amendment: Enhancement for broadband services and monitoring applications," IEEE 802.22 Working Group, Sep. 6, 2013.
International Search Report and Written Opinion from International Application No. PCT/JP2014/080009.
IEEE Std 802.22-2011, Jul. 1, 2011, Part 22: Cognitive Wireless RAN Medium Access Control (MAC) and Physical Layer (PHY) Specifications: Policies and Procedures for Operation in the TV Bands.

*Primary Examiner* — Kashif Siddiqui
*Assistant Examiner* — Minjung Kim
(74) *Attorney, Agent, or Firm* — Brundidge & Stanger, P.C.

(57) ABSTRACT

To establish a wireless link with a terminal station without interfering with a primary user of a frequency, in a system and method in which a base station accesses a management apparatus for managing the frequency available for wireless communication via the wireless link with the terminal station.

7 Claims, 5 Drawing Sheets

WIRELESS COMMUNICATION SYSTEM

TECHNICAL FIELD

The present invention relates to a wireless communication system utilizing a dynamic spectrum access technique, a white space utilization technique, and the like, in which communication is started after confirming an operable frequency to a host system.

BACKGROUND ART

Progress of information society is quite remarkable in recent years, and, in addition to wired communication, utilization of wireless communication has been increasing as a communication method in a lot of information communication devices and services. Accordingly, demand for a radio frequency that is a limited resource also has been increasing, and depletion of an assignable frequency has become a major problem in countries around the world. In general, license management of the frequency is performed by the government, and only those whom licenses are assigned are allowed to utilize the frequency, under strict management, in a specific place and time. However, to meet the frequency demand that is considered to continue to increase in the future, a new frequency utilization method is demanded that is not restricted by a conventional utilization method.

Therefore, in recent years, as the new frequency utilization method to solve the depletion problem of the frequency, a method has been studied for utilizing a frequency band (white space) that is not used spatially and temporally in spite of being assigned already. For example, research and development, and standardization have been performed, such as a cognitive radio communication system in which a user who is not licensed (hereinafter referred to as "secondary user") utilizes a radio wave in the white space flexibly while avoiding sufficiently influence (interference) on frequency use of an existing system of a user who is licensed (hereinafter referred to as "primary user") (for example, Non Patent Literature 1).

For example, in a wide area wireless communication system utilizing the white space that is standardized in IEEE 802.22, each wireless station acquires a transmittable channel list (operable channel list) and maximum allowable transmit power based on location information of the station itself, by accessing a white space database (DB) on an IP network. The operable channel list is collectively managed while being updated as required, by a spectrum manager (SM) in abase station (BS) that is a master device. The BS, based on the operable channel list and maximum transmittable power information of each channel, determines a channel capable of maximizing quality of a communication service of the station itself from the operable channel list as an operation channel (channel used for communication), and performs communication at a frequency of the operation channel with a slave station installed in each house and a terminal station such as a mobile phone (CPE: Customer Premises Equipment) in a service range (cell) of the BS.

In addition, the CPE is also capable of acquiring an operable channel list and maximum transmittable power of itself. Due to the fact that the CPE that is a slave device acquires information by performing information acquisition request to the SM of the BS, influence on channel use of the primary user is avoided, and simultaneously, communication of the secondary user is achieved.

In addition, since DB information (utilization condition, such as the operable channel list, maximum transmittable power) is updated constantly depending on a state of use of the primary user, the wireless communication system utilizing the white space, such as IEEE 802.22, includes a function of updating the DE information by periodic DE access or information notification (push transmission) from the DB and achieving maximization of the communication service of itself while switching the operation channel to avoid influence on the primary user.

Incidentally, in addition to the DB access, in accordance with information obtained from a resource manager (RM) for performing notification of channel operable information considering influence (interference) between the secondary users, not only on the primary user, the BS and the CPE are also capable of determining the operable channel and the maximum transmittable power. As a result, it is also possible to further increase frequency utilization efficiency.

Various techniques have been devised relating to the wireless communication system utilizing the white space.

For example, in Patent Literature 1, it is disclosed that, for a method and apparatus in which a specific station operates as an AP station in a WEAN, the specific station operating as a non-AP station that is allowed to operate in an available channel that is not used by a license device, a specific protocol is defined having each information ID including a registration request and a registration response in association with registration of a location of the station for operating in the white space, and the station is able to register a geographical location of itself with an RLS using the registration request and the registration response defined, and to operate as the AP station in the WS.

CITATION LIST

Patent Literature

Patent Literature 1: JP 2013-529448 N

Non Patent Literature

Non Patent Literature 1: IEEE Std 802.22-2011, 1 Jul. 2011, Part 22: Cognitive Wireless RAN Medium Access Control (MAC) and Physical Layer (PRY) Specifications: Policies and Procedures for Operation in the TV Bands

SUMMARY OF INVENTION

Technical Problem

A wide area wireless communication system using a white space aims to provide a wireless broadband communication service with long distance wireless transmission to a CPE. When it is desired to extend the transmission distance further, use of a method to relay in multiple stages with multi-hop transmission is considered. In that case, it is considered that it can be achieved without changing a standard specification with a method of connecting in multiple stages in an IP layer (layer 3) or higher. For order of connection, a method is considered to connect in the following order.

(First Connection Method)
[Internet]-<wired (Ether)>-[BS1]-<first wireless link (IEEE 802.22)>-[repeater ([CPE1]-<wired (Ether)>-[BS2])]-<second wireless link (IEEE 802.22)>-[CPE2]

Figure 7:
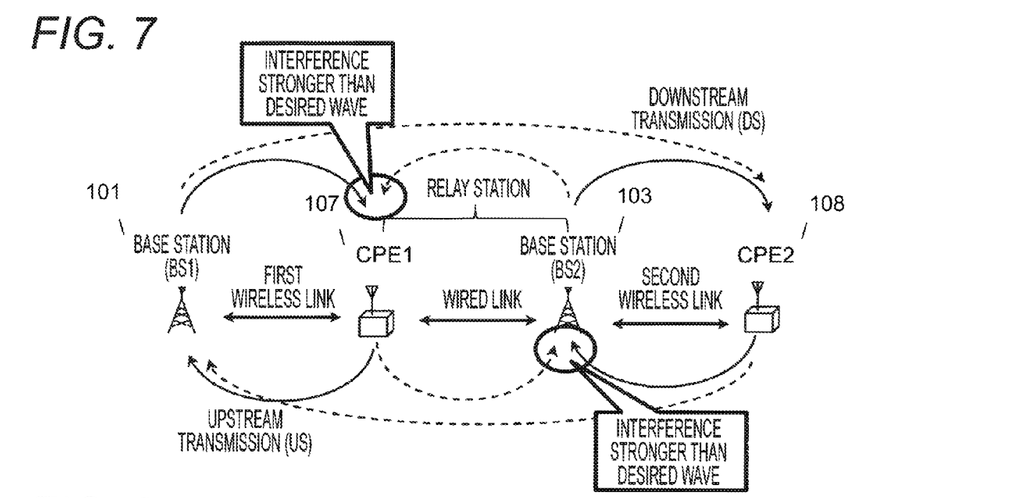
FIG. 7 is a diagram illustrating a relationship of interference in a first connection method.

That is, as illustrated in FIG. 7, the Internet and a BS1 101 are connected with each other by wired connection, and the BS1 101 and a repeater (configured by connecting the CPE1 107 and a BS2 103 with each other by wired connection) is connected with each other by a first wireless link, and the repeater and a CPE2 108 are connected with each other by a second wireless link.

In that case, first, the first wireless link establishes connection in accordance with the normal IEEE 802.22. Thus, the BS2 103 included in the repeater for constructing the second wireless link is capable of accessing the Internet, so that the BS2 is capable of accessing the DB to acquire the operable channel, and capable of constructing the second wireless link in accordance with the IEEE 802.22.

However, in the case of that connection configuration, a problem occurs of isolation in the repeater. Normally, multiple BSs perform synchronization of time with GPS and the like, and operate by synchronizing frames and subframes (downstream transmission period (Downstream subframe (DS) period) and upstream transmission period (Upstream subframe (US) period)) between the BSs. Therefore, as illustrated in FIG. 7, in a transceiver in the repeater, in the US period, a wireless signal of the CPE1 107 for performing upstream transmission of the first wireless link is a strong interference to the BS2 103 for performing reception of the second wireless link, and suppresses a signal transmitted by the CPE2 108 of the second wireless link coming from afar, and interferes with communication of the second wireless link. On the contrary, in the DS period, signal of the BS2 103 is a strong interference to the CPE1 107, so that the signal interferes with communication of the first wireless link. In FIG. 7, a solid arrow represents proper wireless transmission, and a dashed arrow represents interference that should be considered. That phenomenon occurs even in a case in which operation channels are different between the first wireless link and the second wireless link.

Figure 8:
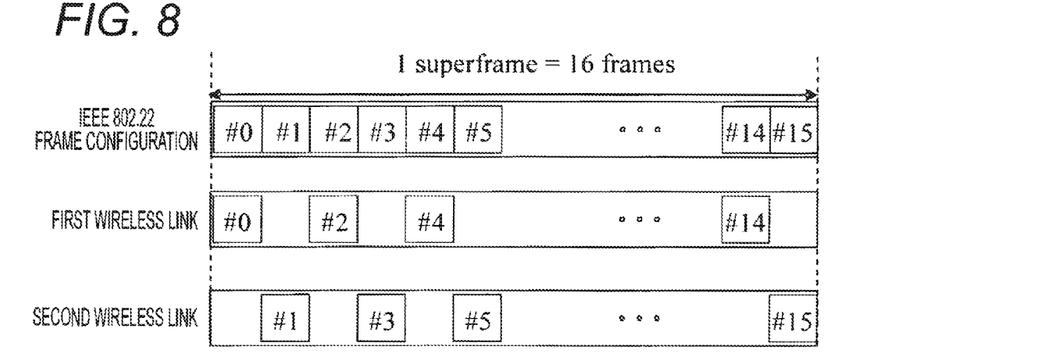
FIG. 8 is a diagram illustrating frame assignment of a first wireless link and a second wireless link for avoiding interference in the first connection method.

As a countermeasure, as illustrated in FIG. 8, a method is considered, for example, in which periods (frames) of the first wireless link and the second wireless link are transmitted by time division so as not to be transmitted simultaneously. However, in such a case, there is a problem that a transmission rate becomes 1/2. Therefore, to return the transmission rate to an original, a method is considered in which individual wireless link uses two channels each; however, the first wireless link and the second wireless link cannot always operate the same channel, so that four channels may be used for the two links, and it is not desirable from a viewpoint of frequency utilization efficiency.

As another connection method, the following method is considered.
(Second Connection Method)
[Internet]-<(wired (Ether)>-[BS1]-<first wireless link (IEEE 802.22)>-[repeater ([CPE1]-<wired (Ether)>-[CPE2])]-<second wireless link (IEEE 802.22)>-[BS2]

Figure 9:
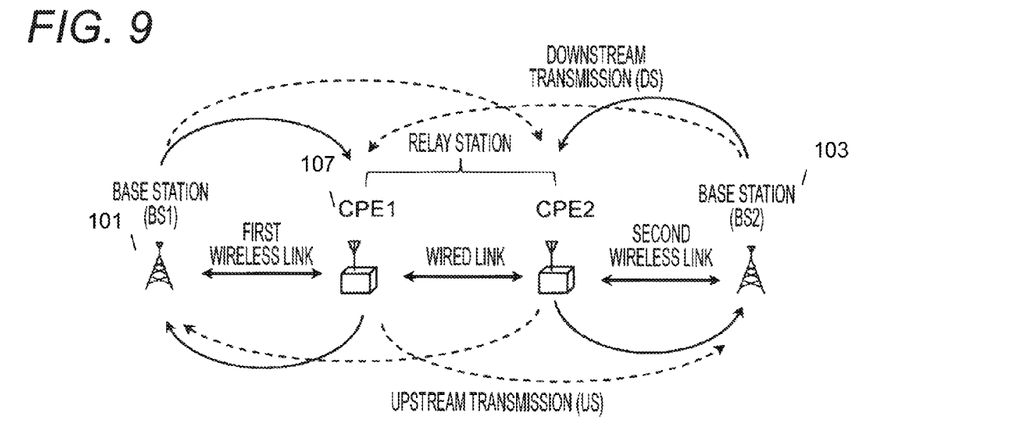
FIG. 9 is a diagram illustrating a relationship of interference in a second connection method.

That is, as illustrated in FIG. 9, the Internet and the BS1 101 are connected with each other by wired connection, and the BS1 101 and the repeater (configured by connecting the CPE" 107 and a CP 22 with each other by wired connection) are connected with each other by the first wireless link, and the repeater and the BS2 103 are connected with each other by the second wireless link.

In the second connection method, transmission timing and reception timing in the repeater in the both links coincide with each other, so that an interference problem as the one in the first connection method does not occur. Therefore, only by operating each one of different channels in each of the first wireless link and the second wireless link, multi-stage relay can be performed at the same transmission rate as one-hop communication, and frequency utilization efficiency is higher than that of the first connection method, and further, a hardware configuration can be easily achieved.

However, the BS2 103 is not able to connect with the DB on the Internet in an initial state, so that the BS2 103 may interfere with the primary user.

The present invention has been made to establish the wireless link with the terminal station without interfering with the primary user of the frequency in the second connection method, that is, a method in which a base station accesses a management apparatus (for example, DB on the Internet) for managing a frequency (channel) available for wireless communication via a wireless link with a terminal station.

Solution to Problem

To solve the above problems, in one aspect of the present invention, a wireless communication system is provided with a management apparatus for managing a frequency available for wireless communication, and in a wireless communication system in which a base station accesses the management apparatus via a terminal station, the base station includes a terminal station mode for operating the base station itself as a terminal station, other than a base station mode for operating the base station itself as the base station, the terminal station includes a base station mode for operating the terminal station itself as a base station, other than a terminal station mode for operating the terminal station itself as the terminal station, when the base station of the base station mode is not able to access the management apparatus via the terminal station, the base station is switched from the base station mode to the terminal station mode, and the terminal station is switched from the terminal station mode to the base station mode, and the terminal station of the base station mode accesses the management apparatus to acquire information of the frequency, and, based on the information of the frequency acquired, establishes wireless communication with the base station of the terminal station mode.

Further, in another aspect of the present invention, after wireless communication is established with the terminal station of the base station mode, the base station of the terminal station mode accesses the management apparatus through the wireless communication to acquire the information of the frequency.

Further, in another aspect of the present invention, after the base station of the terminal station mode acquires the information of the frequency from the management apparatus, the base station is returned to the base station mode from the terminal station mode, and the terminal station is returned to the terminal station mode from the base station mode, and the base station returned to the base station mode establishes wireless communication with the terminal station returned to the terminal station mode, based on the information of the frequency acquired from the management apparatus during the terminal station mode.

Advantageous Effects of Invention

According to the present invention, the wireless link with the terminal station can be established without interfering with the primary user of the frequency, in the method in which the base station accesses the management apparatus (for example, DB on the Internet) for managing the frequency (channel) available for wireless communication via the wireless link with the terminal station.

DESCRIPTION OF EMBODIMENTS

Hereinafter, an embodiment of the present invention is described with reference to drawings. Incidentally, in each of the drawings to be referred to in the following description, equivalent parts with those in other drawings are indicated by the same reference numerals.

[Summary of Wireless Communication System]

Figure 1:
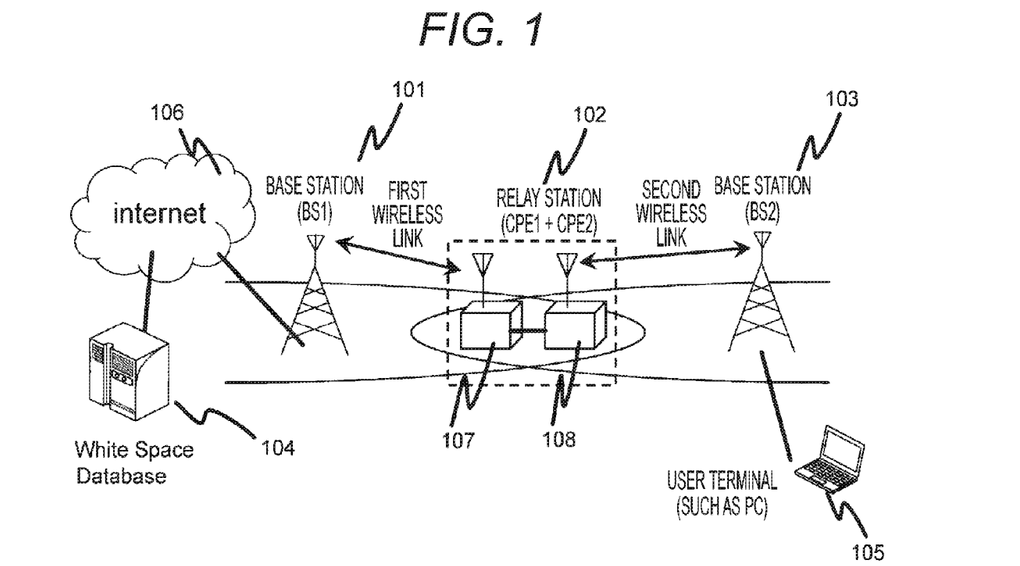
FIG. 1 is a diagram illustrating an example of an overall configuration of a wireless communication system according to an embodiment of the present invention.

FIG. 1 is a diagram illustrating an example of an overall configuration of a wireless communication system according to the present embodiment. The wireless communication system of the example includes a base station 101 (BS1), a relay station 102, a base station 103 (BS2), a white space database (WSDB) 104, a user terminal 105, and Internet 106. The relay station 102 includes two wireless stations of a terminal station 107 (CPE1) and a terminal station 108 (CPE2) installed in the same site. Incidentally, in the present embodiment, the WSDB 104 corresponds to a management apparatus according to the present invention.

The wireless communication system is supposed to be applied to IEEE 802.22 that is a TDD (Time Division DupLex) system, and its basic configuration is the same as a conventional system. However, the system has a configuration different from that of the conventional system; for example, each of the terminal station 108 (CPE2) and the base station 103 (BS2) has a function of switching an operation mode to a BS mode (base station mode) or a CPE mode (terminal station mode), and has a function of sharing information of a connection destination BS between the terminal station 107 (CPE1) and the terminal station 108 (CPE2).

Here, for ease of description, it is assumed that, similar to the access point of Wi-Fi (trademark), the BS (base station 101, 103) operates as a router for separating a wired side and a wireless side into different networks, and the CPE makes the wired side be a network same as the wireless side. Incidentally, the above assumption is not essential, and it may be replaced by other known methods utilizing an appropriate network setting.

[Specific Configuration Example of CPE1, CPE2 in Relay Station]

Figure 2:
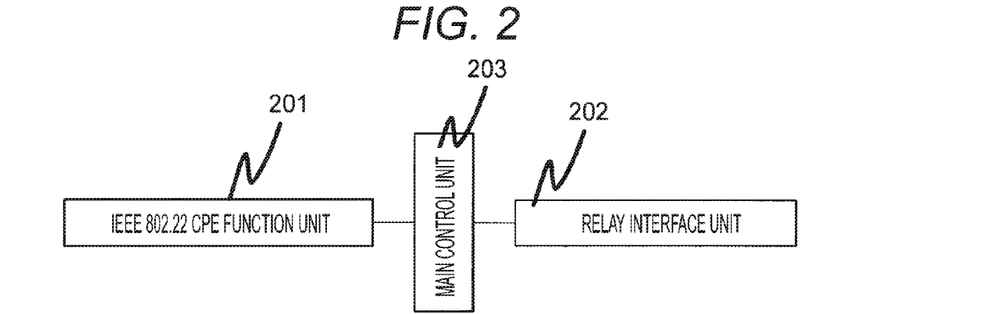
FIG. 2 is a specific configuration diagram of a CPE1.

FIG. 2 illustrates an example of a specific configuration of the terminal station 107 (CPE1).

The terminal station 107 (CPE1) includes an IEEE 802.22 CPE function unit 201, a relay interface unit 202, and a main control unit 203.

The relay interface unit 202 includes a function of exchanging information (MAC address and ID information) of the connection destination BS with the terminal station 108 (CPE2) and holding the information. Based on the information, when the terminal station 108 (CPE2) detects the BS (for example, base station 101 or 103) after the terminal station 107 (CPE1) is connected with the BS (for example, base station 101), it is determined whether or not those BSs are the same BS; when those are the same BS, the terminal station 108 (CPE2) can be controlled not to be connected with the BS. The main control unit 203 performs transfer processing of data and the like, and provides a sublayer function of mediating between MAC of IEEE 802.22 and an upper layer (layer 3), a layer 3 function of routing and the like, access to an MIB (Management information Base) database, and a virtual LAN function. IEEE 802.1D, 802.11s, and the like are supposed for the sublayer function.

The IEEE 802.22 CPE function unit 201 is a function unit for achieving the CPE mode for operating the station itself as a CPE compliant with an IEEE 802.22 CPE, and is controlled by the main control unit 203.

Figure 3:
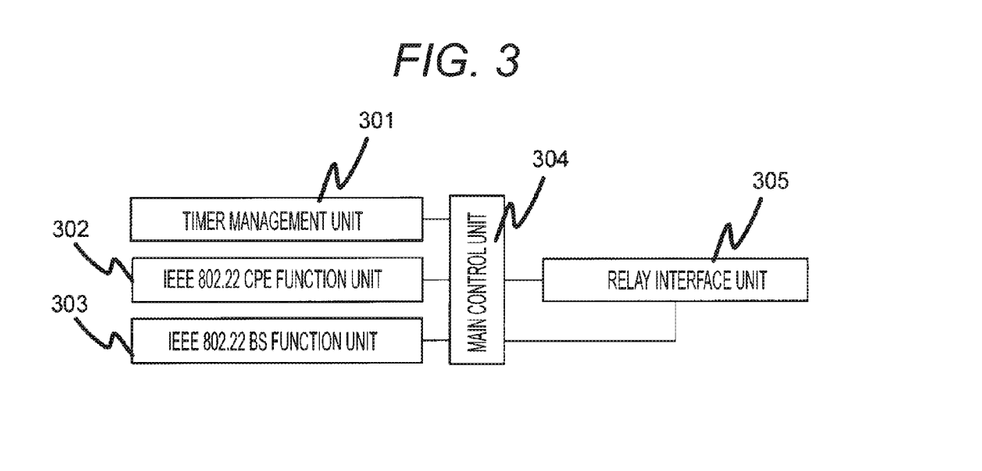
FIG. 3 is a specific configuration diagram of a CPE2.

FIG. 3 illustrates an example of a specific configuration of the terminal station 108 (CPE2).

The terminal station 108 (CPE2) includes a timer management unit 301, an IEEE 802.22 CPE function unit 302, an IEEE 802.22 BS function unit 303, a main control unit 304, and a relay interface unit 305.

The relay interface unit 305 includes a function of exchanging information of the connection destination BS with the terminal station 107 (CPE1) and holding the information. Based on the information, when the terminal station 108 (CPE2) detects the BS, it is determined whether or not the BS is the same as the connection destination BS of the terminal station 107 (CPE1). When those are the same BS, the terminal station 108 (CPE2) can be controlled not to be connected with the BS. Each of the relay interface units 202 and 305 is abstraction of a function achieving means described above rather than a network device of independent hardware, and can be implemented in each of the main control units 203, 304.

The IEEE 802.22 CPE function unit 302 is a function unit for achieving the CPE mode for operating the station itself as a CPE compliant with IEEE 802.22, and the IEEE 802.22 BS function unit 303 is a function unit for achieving the BS mode for operating the station itself as a BS compliant with IEEE 802.22, and both are controlled by the main control unit 304.

The IEEE 802.22 BS function unit 303 stores, in advance, an ID used by the BS (base station 103) of a relay destination candidate during the CPE mode and the like, and tries to connect with the BS in preference to a general CPE.

The terminal station 108 (CPE2) normally operates in the CPE mode, and, when the connection destination BS cannot be detected, switches its operation to the BS mode, and searches the BS of the relay destination candidate that is temporarily in the CPE mode similarly, or receives network entry from the CPE. A switching period of the operation mode is managed using a timer held by the timer management unit 301, and when a predetermined time elapses, the main control unit 304 returns the operation mode to the original CPE mode, or switches to the BS mode.

[Specific Configuration Example of BS2 being Ahead of Relay Station]

Figure 4:
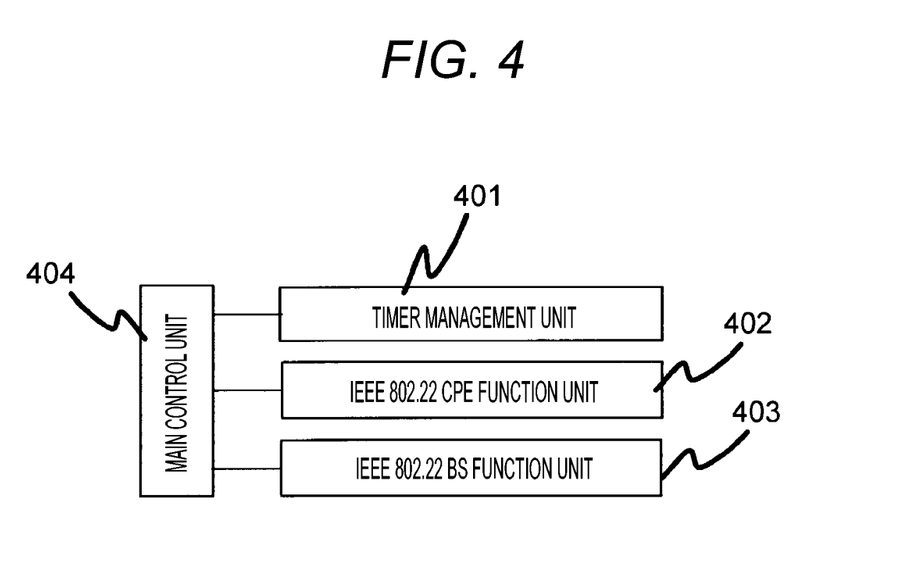
FIG. 4 is a specific configuration diagram of a BS2.

FIG. 4 illustrates an example of a specific configuration of the BS2.

The base station 103 (BS2) includes a timer management unit 401, an IEEE 802.22 CPE function unit 402, an IEEE 802.22 BS function unit 403, and a main control unit 404.

The IEEE 802.22 CPE function unit 402 is a function unit for achieving the CPE mode for operating the station itself as a CPE compliant with the IEEE 802.22 CPE, and the IEEE 802.22 BS function unit 403 is a function unit for achieving the BS mode for operating the station itself as a BS compliant with IEEE 802.22 CPE, and both are controlled by the main control unit 404.

The base station 103 (BS2) normally operates in the BS mode. When it is in a state of not being connected with the Internet 106, the base station 103 switches its operation to the CPE mode, and searches a CPE (relay station) of an upstream side (first wireless link side) being in the BS mode temporarily. A switching period of the operation mode is managed using a timer held by the timer management unit 401. When a predetermined time elapses, the main control unit 404 returns the operation mode to the original BS mode, or switches to the CPE mode. Incidentally, a switching period of the timer management unit 401 should be different from that of the timer management unit 301, and for example, the period can be changed randomly within a predetermined range.

In addition, the base station 103 (BS2), when detecting the CPE (relay station) being in the BS mode temporarily and succeeding in connection, connects with the WSDB 104, and acquires information of an operable white space to hold in a spectrum manager included in the IEEE 802.22 BS function unit 403. The spectrum manager selects an operation frequency to be used in the cell of the station itself, based on the information of the operable white space acquired from the WSDB 104. For that communication, for example, PAWS (Protocol to Access White-Space databases) is used. In addition, the NIB is accessed, and information is exchanged that is necessary for activation as the BS, such as a public key.

[Operation of Wireless Communication System] (Initial Operation)

Figure 5:
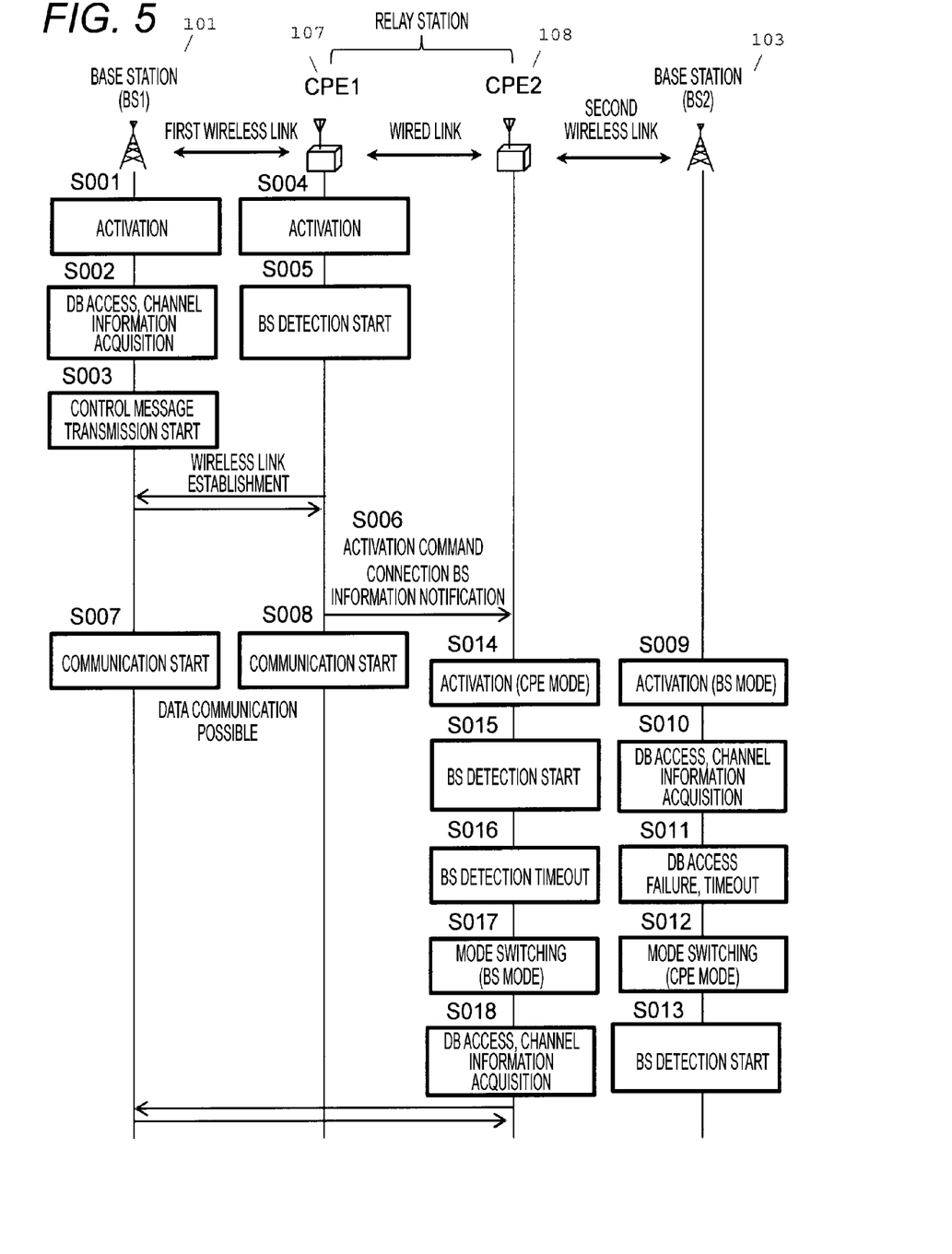
FIG. 5 is a sequence diagram according to initial operation of the system.

Initial operation of the wireless communication system is described with reference to FIG. 5.

First, the base station 101 (BS1) and the terminal station 107 (CPE1) establish the first wireless link in accordance with a procedure of IEEE 802.22 as follows.

The base station 101 (BS1), after activation (S001), accesses the WSDB 104 and acquires information of a channel operable as the white space (S002). After that, notification is performed by broadcast of a control message for the CPE to establish synchronization, such as Superframe Control Header (SCH), FrameControl Header (FCH), Downstream Map (DS-MAP), Upstream Map (US-MAP), Downstream Channel Descriptor (DCD), Upstream Channel Descriptor (UCD) defined by IEEE 802.22 (S003).

The terminal station 107 (CPE1), after activation (S004), detects the BS to synchronize with a neighboring SB and establish connection (S005). When the terminal station 107 receives the control message of the base station 101 (BS1), exchange of transceiver information and the like are performed to establish the first wireless link between the base station 101 and the terminal station 107.

When establishment of the first wireless link is completed, the terminal station 107 (CPE1) notifies the terminal station 108 (CPE2) connected by a wired link with the terminal station 107 itself of an activation command, and further notifies of information of the connection destination BS (MAC address and ID information) (S006). The information of the connection destination BS is information to be referenced so that the terminal station 108 (CPE2) does not connect with the base station 101 (BS1) erroneously when connecting with the base station 103 (BS2) later.

After that, the base station 101 (BS1) and the terminal station 107 (CPE1) are capable of data communication, and start communication (S007, S008).

On the other hand, the base station 103 (BS2) starts operation in the BS mode when activated (S009) and, similar to IEEE 802.22, attempts acquisition of information of the channel operable as the white space with access to the WSDB 104 (S010). However, the base station 103 (BS2) is not connected with the Internet 106, so that the access to the WSDB 104 fails naturally. Then, when the access to the WSDB 104 is attempted a specified number of times or a certain period of time elapses (S011), to establish connection to the Internet 106 once, operation is switched to the CPE mode, and the base station 103 (BS2) operates as a CPE temporarily (S012). After that, similar to the case of the CPE of IEEE 802.22, detection operation of the BS is performed (S013).

The terminal station 108 (CPE2) starts operation in the CPE mode when activated (S014) and, similar to IEEE 802.22, detects the BS to synchronize with a neighboring BS and establish connection (S015). However, the terminal station 108 (CPE2) is not able to detect a base station other than the same base station 101 (BS1) as the connection destination BS of the terminal station 107 (CPE1). Then, when a timeout occurs of detection time of the BS (S016), the terminal station 108 (CPE2) determines that it is necessary to establish a connection line to the Internet 106 for a base station to be a relay destination, and switches operation to the BS mode to operate as a BS temporarily (S017).

The terminal station 108 (CPE2) that has been in the BS mode establishes Internet connection. When the wireless interface side of the base station 101, the terminal station 107, and the wired interface side of the terminal station 108 belongs to the same single network, it is easy for the terminal station 108 to acquire necessary network setting information (such as default gateway address) from a DHCP server opened to the public at a wireless interface side by the base station 101. After that, the terminal station 108 (CPE2) as a base station of IEEE 802.22 accesses the WSDB 104, transmits location information of the station itself and the like to the WSDB 104, and acquires information of the channel operable as the white space at the installation location of the station itself (S018).

(Operation after Temporary Mode Switching)

Figure 6:
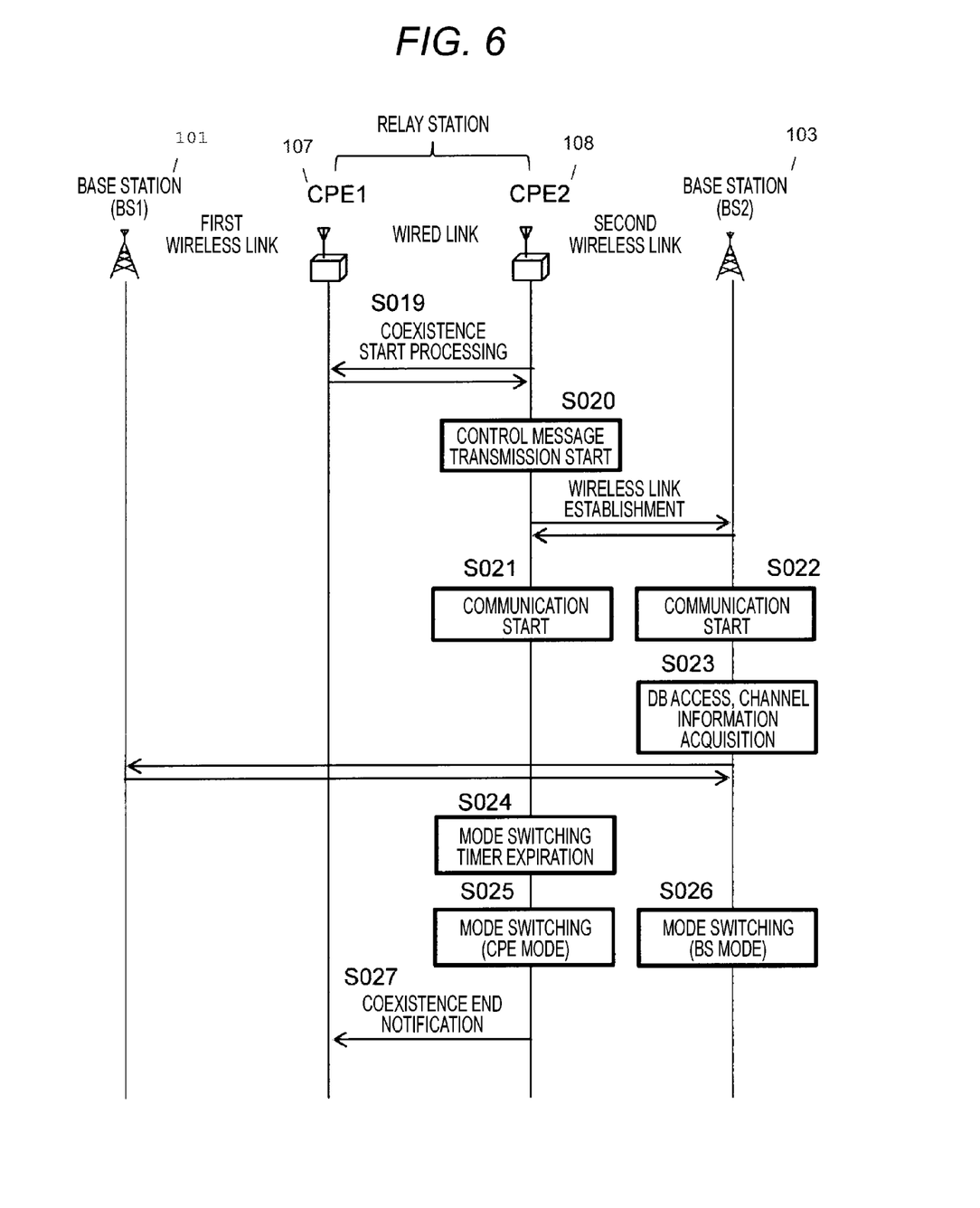
FIG. 6 is a sequence diagram according to operation after temporary mode switching.

Operation after temporary mode switching is described with reference to FIG. 6.

The terminal station 108 (CPE2) selects an operation frequency based on information of the operable white space acquired from the WSDB 104, and starts operation of a cell as a BS using the operation frequency selected, and performs coexistence start processing to avoid interference with the terminal station 107 (CPE1) (S019).

Here, conforming to IEEE 802.22-2011 7.20.3.2 "On-demand Frame Contention," it is set so that the same frame is not operated between the terminal stations 107 and 108 that should coexist with each other. It should be noted that, while Frame Contention of the standard is performed between BSs, that of the example is performed between a CPE and a BS promoted from a CPE. In the example, for instance, as illustrated in FIG. 8, the base station 101 (BS1) uses a frame whose frame number is an even number, and the terminal station 108 that has been promoted to the BS uses an odd number frame, so that transmission is not performed in the same frame simultaneously. The fact that which frame is used by which terminal station can be determined by the terminal station 107 or the base station 101 that is a wireless station of the upstream side (upper level) to instruct through the wired link to the terminal station 108 that is a wireless station of the downstream side (lower level), and can be determined in advance.

The terminal station 107 (CPE1), even when a transmission right of upstream transmission (Upstream) is given from the base station 101 (BS1), does not transmit in a frame in which transmission is prohibited as a result of coexistence setting, and the terminal station 108 (CPE2), as a BS, does not transmit in the frame in which transmission is prohibited as the result of the coexistence setting, so that the base station 101 and the base station 103 (BS2) are able to operate without modifying the IEEE 802.22 function.

In addition, a channel used by the second wireless link, on the premise that a result of access to the WSDB 104 is followed, can be the same channel as the channel of the first wireless link, and can be a different channel from the channel of the first wireless link.

In accordance with that rule, the terminal station 108 operates as a BS (S020), and establishes the second wireless link with the base station 103 (BS2) operating as a CPE to start communication (S021, S022). At that time, network setting information reaches from the DHCP server of the base station 101 to the base station 103 (wireless interface side), and an IP address of the default gateway is appropriately set, so that connection with the Internet becomes possible even from the wired interface side of the base station 103.

The base station 103 (BS2), (as a base station of IEEE 802.22), accesses the WSDB 104 with multi-hop communication with the second wireless link and the first wireless link, and transmits to the WSDB 104 location information of the station itself and the like to acquire information of the channel operable as the white space at the installation location of the station itself (S023). The information is utilized when returning to the BS mode from the CPE mode and performing base station operation. Incidentally, the information itself of the operable channel normally can be acquired by any of the base station and terminal station.

The terminal station 108 (CPE2), when a timer expires that defines temporary mode switching time, or after waiting for completion of acquisition of the operable channel by the base station 103 (disconnection of the base station 103 from the terminal station 108) (S024), switches the operation mode to the CPE mode to return to the original (S025).

Since the base station 103 (BS2) has succeeded in access to the WSDB 104 and completed acquisition of the information of the channel operable as the white space, the base station 103 (BS2) switches the operation mode to the BS mode to return to the original (S026). That is, the base station 103 (BS2) selects an operation frequency based on the information of the operable white space acquired from the WSDB 104, and re-establishes the second wireless link by using the operation frequency selected.

Incidentally, switching of the operation mode of the terminal station 108 (CPE2) can be performed by a method other than timer control described above. For example, when the acquisition of the channel information is completed in the base station 103 (BS2) in S023, a control message of mode switching can be transmitted. In that case, switching timing of the operation mode can be synchronized by a method, for example, in which information is included in the control message of the mode switching for instructing timing at which the switching of the operation mode is performed (for example, performed after N frames), and the operation mode is switched at the timing in accordance with the instruction.

The terminal station 108 (CPE2) transmits a coexistence end notification to the terminal station 107 (CPE1) for notifying the terminal station 107 (CPE1) that coexistence is not necessary since the operation mode is switched to the CPE mode from the BS mode (S027).

After that, the base station 101 (BS1) and the terminal station 107 (CPE1) ends the coexistence, and uses all frames except for a quiet period (QP) for sensing defined by IEEE 802.22 for communication of the first wireless link, and the base station 103 (BS2) and the terminal station 108 (CPE2) start communication same as the normal IEEE 802.22.

By the above procedure, in the wireless communication system for performing dynamic spectrum access utilizing the white space, even when the base station is not able to connect with the Internet, operation of the frequency can be started without interfering the primary user of the frequency. Further, multi-stage relay transmission can be achieved without causing an interference problem in the relay station.

Incidentally, although the processing flow described above is a flow of immediately after activation of the base station 103 (BS2), the flow can also be applied when operating environment of the frequency changes while the base station 103 (BS2) operates wireless communication using the white space and the white space can no longer be used (for example, when the primary user starts operation of a frequency (channel) being used as the white space). By operating the base station 103 (BS2) and the terminal station 108 (CPE2) while appropriately switching the operation mode, Internet connection of the base station 103 (BS2) can be continuously secured.

CONCLUSION

As described above, the present embodiment is a wireless communication system for performing wireless communication using a plurality of frequencies such as the white space, and is a wireless communication system for performing communication while switching the frequency used for the communication (performing dynamic spectrum access). The system includes a first base station, a second base station, a first terminal station, a second terminal station, and a white space database (WSDB). A first wireless link constructed by the first base station and the first terminal station is used as a backhaul line to the Internet, and the second base station and the second terminal station constructs a second wireless link, and communication by the multi-stage relay (multi-hop communication) is performed.

In addition, the first terminal station and the second terminal station are connected with each other by wired connection to configure a relay station, and relay communication between the first base station and the second base station.

In addition, the second terminal station, when the base station cannot be detected other than the base station connected with the first terminal station (first base station), temporarily switches the operation mode to the BS mode (base station mode) to access the WSDB and to be in a waiting state of connection establishment of the terminal station, and operates the cell as a base station, and, after a certain period of time, returns to the CPE mode (terminal station mode) to perform detection operation of the base station.

In addition, when the Internet connection has not been established and the operable frequency has not been acquired, the second base station temporarily switches the operation mode to the CPE mode (base station mode) to connect with the second terminal station that has temporarily switched the operation mode to the BS, and accesses the WSDB to acquire information of the operable channel (operable frequency), and, after a certain period of time, returns to the BS mode (base station mode) to start operation of the channel (frequency) determined based on the information acquired from the WSDB. When the information is held of the operable channel within the expiration date, such as immediately after re-activation, the switching of the operation mode can be omitted.

According to such a configuration, even when the base station is not able to connect with the Internet, the operation can be started without interfering with the primary user, and further, the multi-stage relay transmission can be achieved without causing the interference problem in the relay station.

Incidentally, in the embodiment described above, the communication of two hops configured by the first wireless link and the second wireless link has been described; however, the present invention can be applied equally to communication of three hops or more.

In addition, in the embodiment described above, the second base station of the CPE mode accesses the WSDB via the second terminal station of the BS mode to acquire the information of the operable channel (operable frequency) to be used in the second base station after the operation mode is returned to the BS mode; however, the second terminal station of the BS mode can alternatively acquire the information of the operable channel (operable frequency) to be used in the second base station after the operation mode is returned to the BS mode to transmit as notification information, and provide to the second base station.

In addition, the present invention is particularly suitable in the multi-stage relay of the wireless communication system using the white space; however, it is also effective when communication of one hop is established in a situation in which the base station is not able to connect with the Internet in the initial state (for example, when being isolated from the communication infrastructure at the time of a large scale disaster, or a region in which preparation of the infrastructure is not sufficient, such as a remote area).

Here, configurations of the system and the apparatus according to the present invention are not necessarily limited to those described above, and various configurations can be used. In addition, the present invention can also be provided as, for example, a method or a system for executing the processing according to the present invention, a program for achieving the method or the system, and a recording medium for storing the program.

INDUSTRIAL APPLICABILITY

The present invention can be applied to various types of wireless communication systems in which the base station accesses a management apparatus for managing a frequency available for wireless communication to determine a frequency to be used for wireless communication with a terminal station.

REFERENCE SIGNS LIST

101: base station (BS1)
102: relay station
103: base station (BS2)
104: white space database (WSDB)
105: user terminal
106: Internet
107: terminal station (CPE1)
108: terminal station (CPE2)
201: IEEE 802.22 CPE function unit
202: relay interface unit
203: main control unit
301: timer management unit
302: IEEE 802.22 CPE function unit
303: IEEE 802.22 BS function unit
304: main control unit
305: relay interface unit
401: timer management unit
402: IEEE 802.22 CPE function unit
403: IEEE 802.22 BS function unit
404: main control unit FIG. 1
101 BASE STATION
102 RELAY STATION
103 BASE STATION
105 USER TERMINAL (SUCH AS PC)
FIRST WIRELESS LINK
SECOND WIRELESS LINK FIG. 2
201 IEEE 802.22 CPE FUNCTION UNIT
202 RELAY INTERFACE UNIT
203 MAIN CONTROL UNIT FIG. 3
301 TIMER MANAGEMENT UNIT
302 IEEE 802.22 CPE FUNCTION UNIT
303 IEEE 802.22 BS FUNCTION UNIT
304 MAIN CONTROL UNIT
305 RELAY INTERFACE UNIT FIG. 4
401 TIMER MANAGEMENT UNIT
402 IEEE 802.22 CPE FUNCTION UNIT
403 IEEE 802.22 BS FUNCTION UNIT
404 MAIN CONTROL UNIT FIG. 5
BASE STATION
RELAY STATION
FIRST WIRELESS LINK
WIRED LINK
SECOND WIRELESS LINK
S001 ACTIVATION
S002 DB ACCESS, CHANNEL INFORMATION ACQUISITION
S003 CONTROL MESSAGE TRANSMISSION START
S004 ACTIVATION
S005 BS DETECTION START
WIRELESS LINK ESTABLISHMENT
S006 ACTIVATION COMMAND
CONNECTION BS INFORMATION NOTIFICATION
S007 COMMUNICATION START
S008 COMMUNICATION START
DATA COMMUNICATION POSSIBLE
S009 ACTIVATION (BS MODE)
S010 DB ACCESS, CHANNEL INFORMATION ACQUISITION
S011 DB ACCESS FAILURE, TIMEOUT
S012 MODE SWITCHING (CPE MODE)
S013 BS DETECTION START
S014 ACTIVATION (CPE MODE)
S015 BS DETECTION START
S016 BS DETECTION TIMEOUT
S017 MODE SWITCHING (BS MODE)
S018 DB ACCESS, CHANNEL INFORMATION ACQUISITION FIG. 6
BASE STATION
RELAY STATION
FIRST WIRELESS LINK
WIRED LINK
SECOND WIRELESS LINK S019 COEXISTENCE START PROCESSING
S020 CONTROL MESSAGE TRANSMISSION START WIRELESS LINK ESTABLISHMENT
S021 COMMUNICATION START
S022 COMMUNICATION START
S023 DB ACCESS, CHANNEL INFORMATION ACQUISITION
S024 MODE SWITCHING TIMER EXPIRATION
S025 MODE SWITCHING (CPE MODE)
S026 MODE SWITCHING (BS MODE)
S027 COEXISTENCE END NOTIFICATION
FIG. 7
INTERFERENCE STRONGER THAN DESIRED WAVE
DOWNSTREAM TRANSMISSION (DS)
BASE STATION
RELAY STATION
FIRST WIRELESS LINK
WIRED LINK
SECOND WIRELESS LINK
UPSTREAM TRANSMISSION (US)
INTERFERENCE STRONGER THAN DESIRED WAVE
FIG. 8
IEEE 802.22 FRAME CONFIGURATION
FIRST WIRELESS LINK
SECOND WIRELESS LINK
FIG. 9
DOWNSTREAM TRANSMISSION (DS)
BASE STATION
RELAY STATION
FIRST WIRELESS LINK
WIRED LINK
SECOND WIRELESS LINK
UPSTREAM TRANSMISSION (US)

The invention claimed is:

1. A wireless communication system comprising:
a management apparatus that manages a frequency available for wireless communication; and
a base station that accesses the management apparatus via a terminal station,
wherein the base station includes:
a terminal station mode to operate the base station as a terminal station, and
a base station mode to operate the base station as the base station;
wherein the terminal station includes:
a base station mode to operate the terminal station as a base station, and
a terminal station mode to operate the terminal station as the terminal station;
wherein when the base station operating in the base station mode is not able to access the management apparatus via the terminal station, the base station is switched from the base station mode to the terminal station mode, and the terminal station is switched from the terminal station mode to the base station mode;
wherein the terminal station operating in the base station mode accesses the management apparatus to acquire information of the frequency, and establishes wireless communication with the base station operating in the terminal station mode, based on the information of the frequency acquired; and
after wireless communication is established with the terminal station operating in the base station mode, the base station operating in the terminal station mode accesses the management apparatus through the wireless communication to acquire the information of the frequency;
wherein after the base station operating in the terminal station mode acquires the information of the frequency from the management apparatus, the base station is returned to operating in the base station mode from the terminal station mode, and the terminal station is returned to operating in the terminal station mode from the base station mode, and
wherein the base station returned to the base station mode establishes wireless communication with the terminal station returned to the terminal station mode, based on the information of the frequency acquired from the management apparatus during the terminal station mode.

2. A wireless communication method in a wireless communication system in which sets of a base station and a terminal wirelessly communicating with each other in a TDD system are dependently connected with each other in multiple stages by connecting terminals with each other by wired connection, the wireless communication method comprising:
a first step in which a first base station having an Internet connection establishes a first wireless link with a first terminal paired with the first base station;
a second step in which a second terminal connected with the first terminal by wired connection attempts detection of a second base station paired with the second terminal;
a third step in which the second terminal is promoted to a base station when the detection in the second step fails;
a fourth step in which the promoted second terminal accesses a management apparatus for managing a frequency available as a white space, through the first wireless link and the wired connection, to read a first available frequency;
a fifth step in which coexistence is made between the first terminal and the promoted second terminal, wherein one of the first terminal and the promoted second terminal does not transmit while an other of the first terminal and the promoted second terminal receives, and wherein the promoted second terminal starts operation as a base station;
a sixth step in which the second base station is demoted to a terminal;
a seventh step in which the demoted second base station attempts detection of the promoted second terminal;
an eighth step in which the demoted second base station establishes a second wireless link with the promoted second terminal;
a ninth step in which the demoted second base station accesses the management apparatus through the first wireless link, the wired connection, and the second wireless link, to read a second available frequency;
a tenth step in which the promoted second terminal is returned to the terminal; and
an eleventh step in which the demoted second base station is returned to the base station.

3. The wireless communication method according to claim 2,
wherein in the fourth step, the second terminal hands over location information of the second terminal to the management apparatus, and at a location of the second terminal, reads an operable frequency as the first available frequency, and
wherein in the ninth step, the demoted second base station hands over location information of the second base station to the management apparatus, and reads a frequency operable at a location of the second base station, as the second available frequency.

4. The wireless communication method according to claim 3,
wherein in the tenth step, after a first predetermined time elapses from when the second terminal is promoted or from when the second terminal starts operation as a base station, or after completion of acquisition of the second available frequency by the second base station, the promoted second terminal is returned to the terminal, and
wherein in the eleventh step, after a second predetermined time elapses from when the second base station is demoted or from when the second base station starts operation as a terminal, or after completion of acquisition of the second available frequency, the demoted second base station is returned to the base station.

5. The wireless communication system according to claim 4,
wherein the second terminal repeats the second step for each time when being returned to a terminal in the tenth step, and
wherein the second base station repeats demotion of the sixth step when the Internet connection has not been established and the operable frequency has not been acquired, for each time when being returned to a base station in the eleventh step.

6. The wireless communication system according to claim 2, further comprising:
a twelfth step in which, after the first step and before the second step, the second terminal receives, from the first terminal, identification information of the first base station as information of a base station that cannot be connected,
wherein in the second step, the second terminal detects the second base station utilizing the identification information.

7. The wireless communication system according to claim 4,
wherein the first base station and the second base station are compliant with the same wireless system in which it is defined that a frame being a unit of TDD and a super frame including a plurality of the frames are synchronized with each other, and
wherein in the coexistence of the fifth step, one of the first terminal and the promoted second terminal uses only an odd-numbered frame in the super frame, and an other of the first terminal and the promoted second terminal uses only an even-numbered frame.

* * * * *